(12) United States Patent
Rosenstein et al.

(10) Patent No.: US 9,294,334 B2
(45) Date of Patent: *Mar. 22, 2016

(54) CONTROLLING COMMUNICATION WITHIN A CONTAINER DOCUMENT

(75) Inventors: Justin Rosenstein, Oakland, CA (US); Filipe Almeida, Zurich (CH); Dylan Parker, Victoria (CA); Adam Sah, Santa Cruz, CA (US); Erik Arvidsson, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 2622 days.

This patent is subject to a terminal disclaimer.

(21) Appl. No.: 11/456,703

(22) Filed: Jul. 11, 2006

(65) Prior Publication Data

US 2007/0245310 A1   Oct. 18, 2007

Related U.S. Application Data

(63) Continuation-in-part of application No. 11/298,930, filed on Dec. 12, 2005, now Pat. No. 7,730,082.

(51) Int. Cl.
| | |
|---|---|
| *G06F 15/16* | (2006.01) |
| *H04L 29/08* | (2006.01) |
| *G06Q 30/02* | (2012.01) |

(52) U.S. Cl.
CPC .......... *H04L 29/08072* (2013.01); *G06Q 30/02* (2013.01)

(58) Field of Classification Search
USPC .................................. 709/218; 707/999.003
See application file for complete search history.

(56) References Cited

U.S. PATENT DOCUMENTS

| | | | |
|---|---|---|---|
| 5,636,346 A | 6/1997 | Saxe | 705/1 |
| 5,724,521 A | 3/1998 | Dedrick et al. | 705/26 |
| 5,845,265 A | 12/1998 | Woolston | 705/37 |
| 5,918,010 A | 6/1999 | Appleman et al. | 709/203 |
| 5,920,854 A | 7/1999 | Kirsch et al. | 707/3 |
| 5,931,901 A | 8/1999 | Wolfe et al. | 709/3 |
| 5,974,398 A | 10/1999 | Hanson et al. | 705/14 |

(Continued)

FOREIGN PATENT DOCUMENTS

| | | | |
|---|---|---|---|
| EP | 1026610 | 8/2000 | G06F 17/60 |
| WO | WO 00/38074 | 6/2000 | G06F 17/60 |

(Continued)

OTHER PUBLICATIONS

International Search Report and Written Opinion for International Application No. PCT/US2007/073262, mailed Dec. 12, 2007.

(Continued)

*Primary Examiner* — Tsan-Yu J Huang
(74) *Attorney, Agent, or Firm* — Morgan, Lewis & Bockius LLP

(57) ABSTRACT

A system that serves content in a container document. The system may include a container server, associated with a first source, the container server identifying a first module for use with a container document, receiving a module specification associated with the first module from a second source, and serving the container document with module data based on the module specification. The module data may reference a second module, the second module being associated with the first source to enable communication between the first and second sources.

22 Claims, 8 Drawing Sheets

(56) References Cited

U.S. PATENT DOCUMENTS

| | | | |
|---|---|---|---|
| 6,026,368 A | 2/2000 | Brown et al. | 705/14 |
| 6,044,375 A | 3/2000 | Shmueli et al. | 707/101 |
| 6,061,659 A | 5/2000 | Murray | 705/14 |
| 6,067,570 A | 5/2000 | Kreynin et al. | 709/227 |
| 6,078,866 A | 6/2000 | Buck et al. | 702/2 |
| 6,223,163 B1 | 4/2001 | Van Luchene | 705/1 |
| 6,247,009 B1 | 6/2001 | Shiiyama | 707/3 |
| 6,253,189 B1 | 6/2001 | Feezell et al. | 705/3 |
| 6,269,361 B1 | 7/2001 | Davis et al. | 707/3 |
| 6,285,987 B1 | 9/2001 | Roth et al. | 705/27 |
| 6,298,348 B1 | 10/2001 | Eldering | 705/36 R |
| 6,324,519 B1 | 11/2001 | Eldering | 705/14 |
| 6,336,132 B2 | 1/2002 | Appleman et al. | 709/203 |
| 6,738,804 B1* | 5/2004 | Lo | 709/219 |
| 6,934,697 B1* | 8/2005 | Warren | 1/1 |
| 6,959,319 B1* | 10/2005 | Huang et al. | 709/203 |
| 6,973,483 B2* | 12/2005 | Hewett et al. | 709/213 |
| 7,240,077 B1* | 7/2007 | Edelman et al. | 1/1 |
| 7,475,346 B1* | 1/2009 | Bullock et al. | 709/203 |
| 2001/0042064 A1 | 11/2001 | Davis et al. | 707/3 |
| 2001/0047297 A1 | 11/2001 | Wen | 705/14 |
| 2001/0051911 A1 | 12/2001 | Marks et al. | 705/37 |
| 2002/0002525 A1 | 1/2002 | Arai et al. | 705/37 |
| 2002/0035536 A1 | 3/2002 | Gellman | 705/37 |
| 2002/0046104 A1 | 4/2002 | Kaddeche et al. | 705/14 |
| 2002/0077891 A1 | 6/2002 | Castle et al. | 705/14 |
| 2002/0099605 A1 | 7/2002 | Weitzman et al. | 705/14 |
| 2002/0111898 A1 | 8/2002 | Numaoka et al. | 705/37 |
| 2002/0123988 A1 | 9/2002 | Dean et al. | 707/3 |
| 2002/0152244 A1* | 10/2002 | Dean et al. | 707/530 |
| 2003/0149618 A1 | 8/2003 | Sender et al. | 705/14 |
| 2003/0167315 A1* | 9/2003 | Chowdhry et al. | 709/218 |
| 2004/0015397 A1 | 1/2004 | Barry et al. | 705/14 |
| 2004/0019523 A1 | 1/2004 | Barry et al. | 705/14 |
| 2004/0044571 A1 | 3/2004 | Bronnimann et al. | 705/14 |
| 2004/0059708 A1 | 3/2004 | Dean et al. | 707/1 |
| 2004/0059712 A1 | 3/2004 | Dean et al. | 707/1 |
| 2004/0093327 A1 | 5/2004 | Anderson et al. | 707/3 |
| 2004/0119740 A1 | 6/2004 | Chang et al. | 715/751 |
| 2004/0167928 A1 | 8/2004 | Anderson et al. | 707/104 |
| 2004/0249709 A1 | 12/2004 | Donovan et al. | 705/14 |
| 2005/0050021 A1* | 3/2005 | Timmons | 707/3 |
| 2005/0065806 A1 | 3/2005 | Harik | 705/1 |
| 2005/0071224 A1 | 3/2005 | Fikes et al. | 705/14 |
| 2005/0096979 A1 | 5/2005 | Koningstein | 705/14 |
| 2005/0131758 A1 | 6/2005 | Desikan et al. | 705/14 |
| 2005/0131762 A1 | 6/2005 | Bharat et al. | 705/14 |
| 2005/0144069 A1 | 6/2005 | Wiseman et al. | 705/14 |
| 2005/0216335 A1 | 9/2005 | Fikes et al. | 705/14 |
| 2006/0010134 A1 | 1/2006 | Davis et al. | 707/10 |
| 2006/0041637 A1* | 2/2006 | Jerrard-Dunne | 709/219 |
| 2007/0130518 A1* | 6/2007 | Shavit et al. | 715/530 |
| 2007/0136201 A1 | 6/2007 | Sah et al. | 705/51 |
| 2007/0136320 A1 | 6/2007 | Sah et al. | 707/100 |
| 2007/0136337 A1 | 6/2007 | Sah et al. | 707/101 |
| 2007/0136443 A1 | 6/2007 | Sah et al. | 709/219 |

FOREIGN PATENT DOCUMENTS

| | | | |
|---|---|---|---|
| WO | WO 03/007186 A2 | 1/2003 | |
| WO | WO 2004/042525 | 5/2004 | G06F 17/60 |

OTHER PUBLICATIONS

Arrington, M. "Profile-Konfabulator/YahooWidgets," http://www.techcrunch.com/tagKonfabulator/, Jul. 26, 2005, 6 pages.

Arrington, M., "Profile-MSN Start.com," http://www.techcrunch.com/tag/Start.com/, Jun. 3, 2005, 3 pages.

Castle, B. "Introduction to Web Services fro Remove Portlets," http://www-128.ibm.com, developerworks/library/ws-wsrp/, Apr. 15, 2005, 7 pages.

Lynn, R. et al., "Creating a JSR 168 Portlet for Use by Diverse Portals using Web Services fro Remote Portlets," http://www-128.ibm.com/developerworkswebsphere/library/tutorials/0510_lynn/0510_lyn . .., Oct. 26, 2005, 2 pages.

MacManus, R. "Microsoft's Start.com Opens Up: Web 2.0 Explorer," http://blogs.zdnet.com/web2explorer/?p=9, Sep. 14, 2005, 4 pages.

Pandey, P., "JSR 168, WSRP, Portlets & Enterprise Portal," htpp://portlets.blogspot.com/, May 17, 2006, 18 pages.

Rubio, D. "Web Services, Portlets and WSRP," http://searchwebservices.techtarget.com/tip/1,28943,sid26_gc1134722,00.html, Oct. 18, 2005, 6 pages.

Sherman, C. "Google Launches AdWords Select," http://searchenginewatch.com/searchday/article.php/2159301, Feb. 20, 2002, 6 pages.

Google Inc., "Google Introduces New Pricing for Popular Self-Service Online Advertising Program," http://www.google.com/press/press/select.html, Feb. 20, 2002, 2 pages.

Start.com, "Start.com Developer Center: Updates and Events," http://start.com/developer/default.htm, Sep. 14, 2003, 2 pages.

Start.com, "Start.com Developer Center: Getting Started with Start.com Gadgets," http://start.com/developer/gettingstarted.aspx, 2005, 2 pages.

Start.com, "Start.com Developer Center: Atlas Runtime Reference," http://start.com/developer/atlasruntime.aspx, 2005, 6 pages.

Start.com, "Start.com Developer Center: Bindings Reference," http://start.com/developer/binding_ref.aspx, 2005, 11 pages.

Yahoo.com, "Widgets-Information," http://widgets.yahoo.com/info, 2005, 2 pages.

Yahoo.com, "Widgets-FAQ," http://widgets.yahoo.com/faq/, 2005, 4 pages.

Yahoo.com, "Widgets-Basics," http:widgets.yahoo.com/basics/, 2005, 4 pages.

Yahoo.com, "Widgets-Version History," http://widgets.yahoo.com/versionhistory/, 2005, 11 pages.

Apple Computer, Inc., "Dashboard: Handy Widgets at you Command," http://www.apple.com/macsosx/features/dashboard/, printed May 23, 2006, 4 pages.

Apple Computer, Inc., "Featured Widget: Art Directors Toolkit Widget," http://www.apple.com/downloads/dashboard/, May 17, 2006, 3 pages.

Apple Computer, Inc., "Tiger Developer Overview Series: Developing Dashboard Widgets," http://developer.apple.com/macosx/dashboard.html, Mar. 6, 2006, 11 pages.

Apple Computer, Inc., "Exposé: Find the window you need. Now," http://www.apple.com/com/macosx/features/expose/, 2006, 2 pages.

Sun Microsystems, Inc., "Introduction to JSR 168-The Portlet Specification," http://developers.sun.com/prodtech/portalserver/reference/techart/jsr168/, Jul. 17, 2003, 3 pages.

"DashboardExposed Newest Widgets," http:www.dashboardexposed.com/index/sidelinks-newest-action, 2005, 5 pages.

"Konfabulator-Gallery," http://www.widgetgallery.com, 2005, 3 pages.

Collection of pages from findwhat.com, http://www.findwhat.com, printed Jul. 29, 2003, 52 pages.

Collection of pages from Sprinks.com, http://www.sprinks.com, printed Jul. 29, 2003, 11 pages.

Collection of pages from Kandoodle.com, http://www.kanoodle.com, printed Jul. 29, 2003, 5 pages.

Collection of pages from Google Advertising/AdWords, http://www.google.com, printed Jul. 29, 2003, 40 pages.

Collection of pages from Overture Services, Inc. www.overture.com, printed Jul. 29, 2003, 4 pages.

\* cited by examiner

```
MAIN_WINDOW (a.com):
<html>
<head>
<script>
function ProcessPayload([payload]) {
...
}
</script>
</head>
<body>
<iframe id="IFRAME_1" src="http://b.com/iframe_1.html"></iframe>
</body>
</html>
```

Fig. 4

```
IFRAME_1 (b.com):
<html>
...
<script>
var iframe_2 = document.createElement("IFRAME");
iframe_2.src = "http://a.com/iframe_2.html#" + [payload];
</script>
...
</html>
```

Fig. 5

```
IFRAME_2 (a.com):
<html>
...
<script>
[payload] = location.hash;
window.parent.parent.ProcessPayload([payload])
;
</script>
...
</html>
```

Fig. 6

MAIN_WINDOW (a.com): ⎯ 910
```
<html>
<head>
<script>
function ResizeModuleHeight(height) {
  var iframe_1 = getElementById("IFRAME_1");        } 913
  iframe_1.style.height = height + "px";
}
</script>
</head>
<body>
<iframe id="IFRAME_1" src="http://b.com/iframe_1.html"></iframe>
</body>
</html>
```

IFRAME_1 (b.com): ⎯ 911
```
<html>
<head>
<script>
function RequestResize() {
  // Find out how much space this page takes up
  var iframe_1_height = document.body.scrollHeight;        } 914

// Create an a.com IFRAME and pass our height as a URL parameter ⎯ 915
  var iframe_2 = document.createElement("IFRAME");
  iframe_2.src = "http://a.com/resize_module.html#" + iframe_1_height;  ⎯ 916
  document.body.appendChild(iframe_2);
}
</script>
</head>
<body onload="RequestResize()">
...
Some contents taking up arbitrary space.
...
</body>
</html>
```

IFRAME_2 (a.com): ⎯ 912
```
<html>
<head>
<script>
// Extract the height from the hash URL parameter
var iframe_1_height = location.hash.substring(1);   ⎯ 917

// Call the ResizeModule method in MAIN_WINDOW with the height parameter   ⎯ 918
window.parent.parent.ResizeModuleHeight(iframe_1_height);
</script>
</head>
<body></body>
</html>
```

Fig. 7

MAIN_WINDOW (a.com): ⟋— 920
```
<html>
<head>
<script>
function SavePreference(pref_value) {
// communicate with a.com server to save the pref_value
...
}
</script>
</head>
<body>
<iframe id="IFRAME_1" src=" http://b.com/iframe_1.html"></iframe>
</body>
</html>
```
⎫
⎬ 923
⎭

IFRAME_1 (b.com): ⟋— 921
```
<html>
<head>
<script>
function RequestSavePreference(value) {
// Create an a.com IFRAME and pass the value as a URL parameter      ⟵ 924
var iframe_2 = document.createElement("IFRAME");
iframe_2.src = " http://a.com/save_preference.html#" + value;        ⟵ 925
document.body.appendChild(iframe_2);
}
</script>
</head>
<body>
A checkbox whose value we want to persist.
<input type="checkbox"
onchange="RequestSavePreference(this.value)">
</body>
</html>
```

IFRAME_2 (a.com): ⟋— 922
```
<html>
<head>
<script>
// Extract the value from the hash URL parameter   ⟵ 926
var value = location.hash.substring(1);

// Call the SavePreference method in MAIN_WINDOW with the value       ⟵ 927
parameter
window.parent.parent.SavePreference(value);
</script>
</head>
<body></body>
</html>
```

Fig. 8

CONTROLLING COMMUNICATION WITHIN A CONTAINER DOCUMENT

FIELD OF THE INVENTION

Embodiments of the present invention relate to controlling communication within a container document.

BACKGROUND OF THE INVENTION

Many browsers prevent code that is hosted on one domain from accessing code that is hosted on a different domain. Where a document is hosted on one domain and references content hosted on a different domain, the document is typically precluded from communicating with or accessing the content on the different domain.

This and other drawbacks exist with current systems.

SUMMARY OF THE INVENTION

Accordingly, various exemplary embodiments of the present inventions may be directed to a method and system that serves content in a container document. The system may include a container server, associated with a first source, the container server identifying a first module for use with a container document, receiving a module specification associated with the first module from a second source, and serving the container document with module data based on the module specification. The module data may reference a second module, the second module being associated with the first source to enable communication between the first and second sources.

In another embodiment, a system that serves content in a container document may be provided. That system may include a container server associated with a first domain, the container server to identify a first inline frame for use with a container document, receive a module specification associated with the first inline frame from a second domain, and serve the container document with module data based on the module specification and a module server associated with the second domain, the module server to receive a request from the container server for the first inline frame and provide the first inline frame to the container server. The first inline frame may include data to generate a uniform resource locator (URL) string that includes a parameter that references a second inline frame, the second inline frame being associated with the container server. Also, the second inline frame may include data to extract the parameter and passes the parameter to the container document.

Other embodiments may be considered.

BRIEF DESCRIPTION OF THE DRAWINGS

FIG. 4 depicts an illustrative container document for enabling controlled communication with a module according to an embodiment of the present invention.

FIG. 5 depicts an illustrative module for communicating with a container document according to an embodiment of the present invention.

FIG. 6 depicts an illustrative module for communicating with a container document according to an embodiment of the present invention.

FIG. 7 depicts an illustrative process for controlling communication within a container document according to an embodiment of the present invention.

FIG. 8 depicts an illustrative process for controlling communication within a container document according to an embodiment of the present invention.

DETAILED DESCRIPTION OF EXEMPLARY EMBODIMENT(S)

Figure 1:
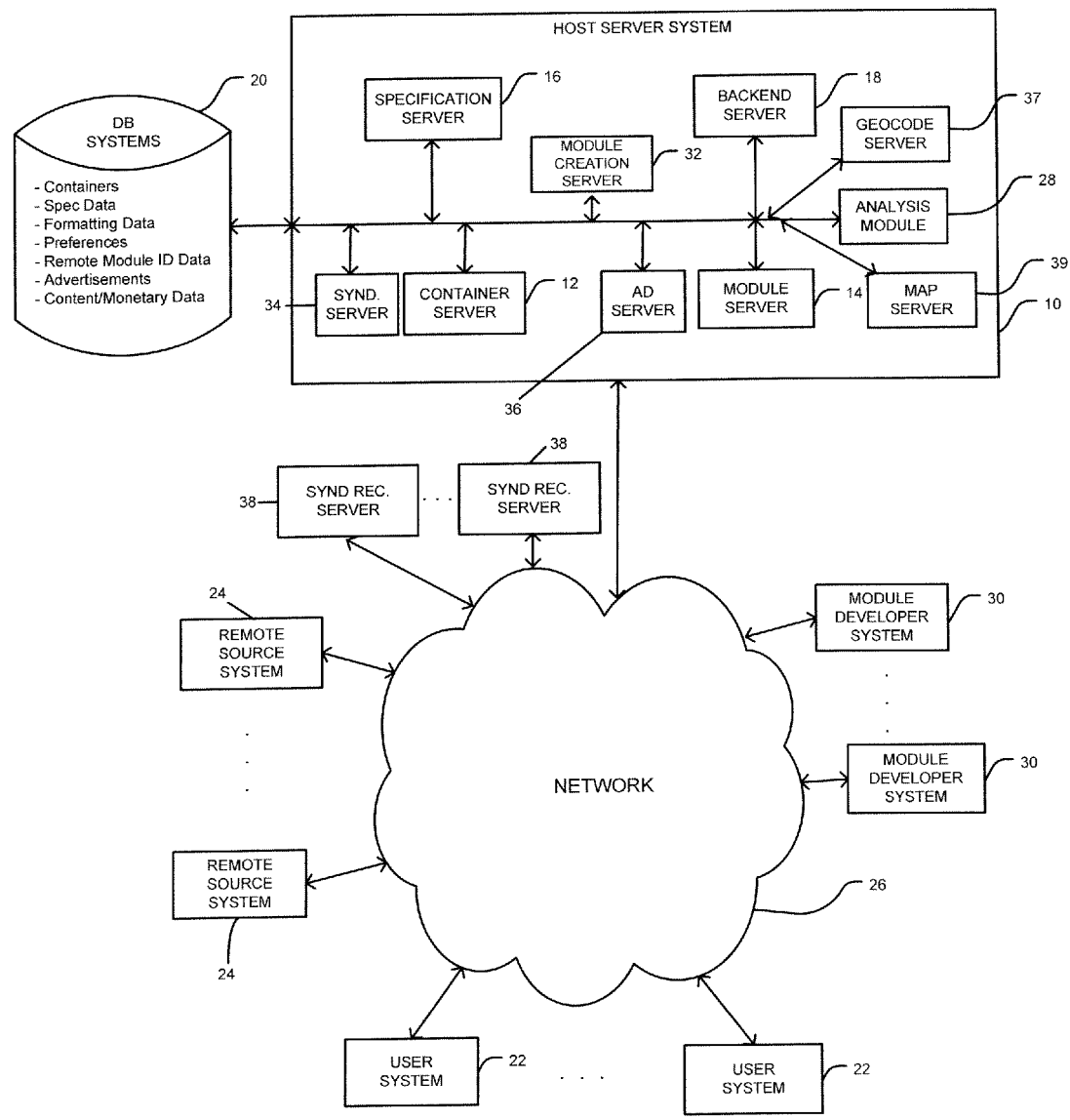
FIG. 1 depicts an overall system architecture according to various embodiments of the present invention.

Exemplary embodiments are discussed in detail below. While specific exemplary embodiments are discussed, it should be understood that this is done for illustration purposes only. A person skilled in the relevant art will recognize that other components and configuration can be used without departing from the spirit and scope of the claimed inventions.

Various embodiments of the present invention relate to controlling communications within a container document.

Illustrative Container Document Environment for Use of Embodiments

One illustrative example of a container document may be such as one used in connection with a personalized portal size. A personalized portal site (e.g., My Yahoo!, start.com, or Google Personalized Homepage) may allow the user to select only content (e.g., interactive, read-only, updating, data feeds, etc.) to display on a personalized page, such as a new email alerts, current weather and/or traffic conditions, movie showtimes, horoscopes, etc. According to one embodiment of the present invention, the illustrative example of using modules may involve modules that may be incorporated into a personalized portal page (one example of a container document) along with modules developed (e.g., by an a third party developer) for inclusion in the container.

Therefore, for illustrative purposes, an explanation of the container documents or modules is provided here, but it should be appreciated that the various embodiments may be employed in connection within other contexts as well. In addition, details regarding the modules are provided in detail in four co-pending and commonly assigned patent applications, all of which are hereby incorporated by reference in their entirety. Such application are: U.S. patent application Ser. No. 11/298,930 filed Dec. 12, 2005 and entitled "Remote Module Incorporation Into a Container Document," pending; U.S. patent application Ser. No. 11/298,922 filed Dec. 12, 2005 and entitled "Module Specification for a Module to be Incorporated Into a Container Document," pending; U.S. patent application Ser. No. 11/298,987 filed Dec. 12, 2005 and entitled "Customized Container Document Modules Using Preferences," pending; and U.S. patent application Ser. No. 11/298,988 filed Dec. 12, 2005 and entitled "Proxy Server Data Collection," pending. While details are provided in this application, in general, such a system may be understood by the following.

The system may comprise a number of components. The system may comprise a container server that serves a container document (e.g., a personalized page). The container document "contains" one or more modules, including one or more remote modules. As used herein, the term "container document" or "container" should be understood to include a personalized homepage of a website, a sidebar, toolbar element that incorporates one or more such modules, a page hosted by a site, a document capable of rendering modules (e.g., any document capable of rendering HTML code or XML code) in the format of the module (e.g., XML). Also, the container may be a website of another entity that incorporates the modules when supplied the modules through a syndication system.

As used herein, the term "module" may be understood to refer to a piece of software and/or hardware that renders data for use in a container document. Modules may be personalized to user preferences, preferences of the container, preferences of the environment or other inputs. In an exemplary embodiment, various modules may or may not be visible to the viewer of the container document. A module specification may be understood to include a set of instructions used to render data for the container document using elements that have been predefined.

Overview and System Architecture of Container Document System

FIG. 1 depicts an overall system diagram in which the communication embodiments may be employed according to one embodiment of the present invention. As illustrated, FIG. 1 may comprise a host server system 10 with a plurality of modules that may be associated therewith. Such modules may comprise a container server 12, a module server 14, a specification server 16, a back end server 18, an analysis module 28, a module creation server 32, a syndication server 34, an advertisement server 36, a geocode server 37 and a map server 39. As illustrated, personalized container server 10 may connect over a network 26 to a plurality of systems.

Other systems connected to the network may comprise one or more user systems 22, one or more remote source systems 24, one or more module developer systems 30 and one or more syndication recipient servers 38. In addition, one or more database systems 20 may operate in conjunction with the various modules of host server system 10.

Container server 12 may serve the container document to user systems 22 over network 26. Container server 12 may comprise a web server or related server systems that takes data and/or instructions and formulates a container for transmission over the network to the user system 22. It should be appreciated, however, that container server 12 may reside on user system 22 as well so that a network connection may not be used. In the example in which the container document comprises a word processing document, for example, container server 12 may comprise a word processing module.

Module server 14 may provide data from modules to container server 12 for incorporation into a container document. It should be appreciated that in one embodiment, container server 12 and module server 14 may comprise a single unit performing both functions. Module server 14 may provide data for the container document by interpreting and/or parsing instructions in the module specification associated with the module. According to one embodiment, module server 14 may serve the module content to the container document through the use of a browser inline frame (IFRAME). An IFRAME may be generally understood to be an independently operated browser window instance inside the container document. One advantage of an IFRAME is that is protects the container document from the IFRAME's content and vice versa, e.g., JavaScript on the container document may not be permitted to access any JavaScript code in the inner IFRAME (same for CSS, DOM, or cookie objects). In an exemplary embodiment, this failure to permit access to any JavaScript code in the inner IFRAME may be the result of security settings of the browser.

To expedite display of container documents, modules may be displayed inline within the container document. Inline display may be understood as referring to display with other document elements. One example is a display generated from code for HTML in the body according to HTML standards. In one embodiment, module server 14 or some other component may determine whether the module is deemed trusted prior to including it in the container document inline due to the risks of various security issues an inline module could create. According to one embodiment, the module may incorporate an indicia of approval (e.g., digital certificate) issued by the container module or an entity associated with the container module as described in detail below. If the indicial of approval is present, module server 14 may render the data from a module for inline presentation in the container document.

Specification server 16 provides the module specification file to module server 14. The module specification may be cached and stored in a database accessible to the module server 14 and/or specification server 16 or may be retrieved from a location associated with the specification as detailed later. For example, specification server 16 may reside on a remote source system 24. In addition, specification server 16 may be connected to module server over a network with the module specification located at another location on the network accessible to specification server 16.

Backend server 18 may be provided for interacting with one or more databases (e.g., large or dynamic databases of information). For example, for a news module that obtains frequent updates and demands a flow of data, (e.g, from an RSS feed), backend server 18 may format the data into HTML for the container.

In one specific example, a person may create a module (e.g., a maps module), such as one that uses an application program interface (API) to an existing mapping program to create a module to display a map of downtown Mountain View, Calif. The module may comprise an XML specification file or module specification file stored on a specification server. The specification server may comprise any server, including one on the site from which the container page is hosted or any other site. The user or another person may then include this new module on a personalized homepage (container document). The server that serves the container document may operate as the module server and the server that generates the mapping data through an inquiry from its API may be considered to be the backend server.

According to one embodiment of the present invention, analysis module 28 may analyze modules at various times (e.g., when the module is first selected by a user, each time the module is called by a container for inclusion or at any other time determined to be advantageous for safety and security and other times). Analysis module 28 may perform a number of actions, including comparing the module with a list of disapproved or dangerous modules or a list of approved modules. The comparison may involve exact or substring (e.g., prefixes, suffixes and regular expressions) matching by name or location (e.g., URL), contents of the specification, contents of the location where the specification resides, or information that may be ascertainable about the module. Analysis module 28 may take one or more actions in response to a determination that the module is disapproved or dangerous, including, for example, silently blocking the request, (i.e. providing a generic error), blocking the request with an error that explains the reason it was blocked or redirecting the request to a different module specification that has been determined to be safe and related to the disapproved module (e.g., another module that relates to maps, if the first one was a disapproved mapping site or a module that includes the keyword "basketball" if the disapproved module was a basketball module). For example, through redirection, the URL of the original module may be passed to the "safe" module. The safe module may then use a proxy server, as described below, to retrieve the original URL's content. Developers may then replace the error handler to fix small bugs in the original module to be able to display the content of the original module. In another embodiment, analysis module 28 may parse the module content to determine whether it is safe, such as by compiling JavaScript or other scripts contained in the module to try to identify unsafe or undesired actions the module may perform.

One or more module creation servers 32 may be provided. This server may operate as a "wizard" to enable module creators to create a module through an interactive process controlled by module creation server 32. For example, module creation server 32 may provide a series of user interfaces that enable the module creator to provide inputs that are then used by the module creator to automatically generate a module specification. For example, various module specification templates may be provided with corresponding inputs. Module creation server 32 may then take inputs supplied by a module creator, insert them into the template and then generate the module specification for the module. A preview, testing and debugging function may also be offered as part of this "wizard." This module may be downloadable as well so it may be installed and operated at any node on the network.

A syndication server 34 may prepare data for transmission to one or more syndication recipient servers 38 related to modules. Syndication server 34 may receive a request for a module and/or module content and deliver that module or content to a syndication recipient server 38 over network 26. Syndication server 34 may reside at host server system 10 or at another location on the network. For example, if an operator of a sports web site (an example of a syndication recipient system 38) desired to include a maps module created by a remote source system 24, it may do so through a request to syndication server 34. Syndication server 34 may then cooperate with module server 14 to generate data for the container document (here the sports web site page of the syndication recipient system 38). That may involve retrieving the module specification from remote source system 24, supplying preferences received from the syndication recipient server 38 (e.g., city information for the sports team of a page being displayed) and/or generating data for the container. It is also possible that the data may be rendered at syndication recipient server 38 into its container document in either an IFRAME or inline. Syndication server 34 may thus syndicate modules accessible to it. It may do so based on requests for specific modules or other criteria it determines (e.g., content matches, keyword matches, monetary values associated with modules and/or syndication requesters, etc.)

Ad server 36 may provide advertisements associated with modules to containers. For example, an advertisement may be incorporated with module data when data is delivered to a container document. Ad server 36 may operate with syndication server 34 to deliver advertisements to syndication recipient servers 38 based on a syndication request for a module. The advertisements may be selected by ad server 36 based on a wide variety of criteria, including, but not limited to, the relationship between the content of or information about the container, module, other modules in the container, syndication recipient server information, monetary elements/relationships related to any of the foregoing and/or combinations thereof. Ad server 36 may comprise the Google AdSense system, according to one embodiment of the present invention. Ad server 36 may operate as described in one or more of the following patent applications, the subject matter of which is hereby incorporated by reference in their entirety. Specifically, ad server 36 may manage online advertising by associating two or more concepts related to a module with an advertisement and associating a bid, collectively, with the two or more keywords in the manner discussed in the context of serving advertisements with electronic documents in U.S. patent application Ser. No. 10/340,193, filed on Jan. 10, 2003, entitled "Pricing Across Keywords Associated with One or More Advertisements," which is incorporated by reference herein in its entirety. Additional examples of presenting advertisements and managing advertising costs are discussed in U.S. patent application Ser. No. 10/340,543, filed on Jan. 10, 2003, entitled "Automated Price Maintenance for Use With a System in which Advertisements are Rendered with Relative Preferences" and U.S. patent application Ser. No. 10/340,542, filed Jan. 10, 2003, entitled "Automated Price Maintenance for Use With a System in Which Advertisements are Rendered with Relative Preference Based on Performance Information and Price Information," which are incorporated by reference herein in their entireties.

A geocode server 37 may be provided to generate geocode information from location descriptions as is known in the art. A geocode server 37 may generate latitude and longitude numeric values from geographic locations.

A map server 39 may generate map output. Mapping systems, such as Google Maps and Google Earth, may be used to generate this data.

One or more database systems 20 may be provided that store, in any number of ways, container information, module specifications and/or related information, formatting data, per-user and per-module preference data, remote module ID data, remote module location reference data, advertisement data, advertiser data, content/monetary data, syndication recipient data, templates for modules, inputs for modules, lists of trusted and untrusted modules, approval criteria and related information and/or any other information used by the modules to operate as described herein. While a single database structure is shown, it is well understood that the data may be stored at a number of locations and in one or more systems.

While one configuration is shown in FIG. 1, it should be appreciated by one of ordinary skill in the art that other configurations of these various modules may also be possible. For example, the various modules depicted within host server system 10 may be disposed at various locations around network 26 or at various points on several networks. In addition, whereas a single host server system 10 is depicted, it should be appreciated that any number of each of the modules depicted on FIG. 1 may be provided including network 26.

In one embodiment, network 26 may comprise the Internet. Other networks may also be utilized for connecting each of the various systems and/or servers.

In addition, what is shown as user system 22 may also operate as a remote source system 24 and/or a module developer system 30. In other words, one computer system may operate in different capacities: as a user system, as a remote source system, as a syndication server, as a target content server, and/or a module developer system. In addition, as explained in greater detail below, each of the modules depicted within host server system 10 may also be disposed at a user system 22, a remote source system 24, or a module developer system 30. Similarly, databases 20 may be associated with each of the modules depicted within FIG. 1 depending upon the configuration desired.

Illustrative Container Document Including Modules

According to one embodiment of the present invention, systems and method are provided to incorporate modules into a container document. One example of a container document would be a personalized home page, such as the Google Personalized Homepage currently available to users of the Google services on the Internet. Instead of restricting the types of content that a user is able to include in a container document such as a personalized home page, one or more embodiments of the present invention enable users to select modules from sources other than the source of the container document. So, for example, a user may elect to include a module in his or her personalized Google home page from a source not associated with Google.

Figure 2:
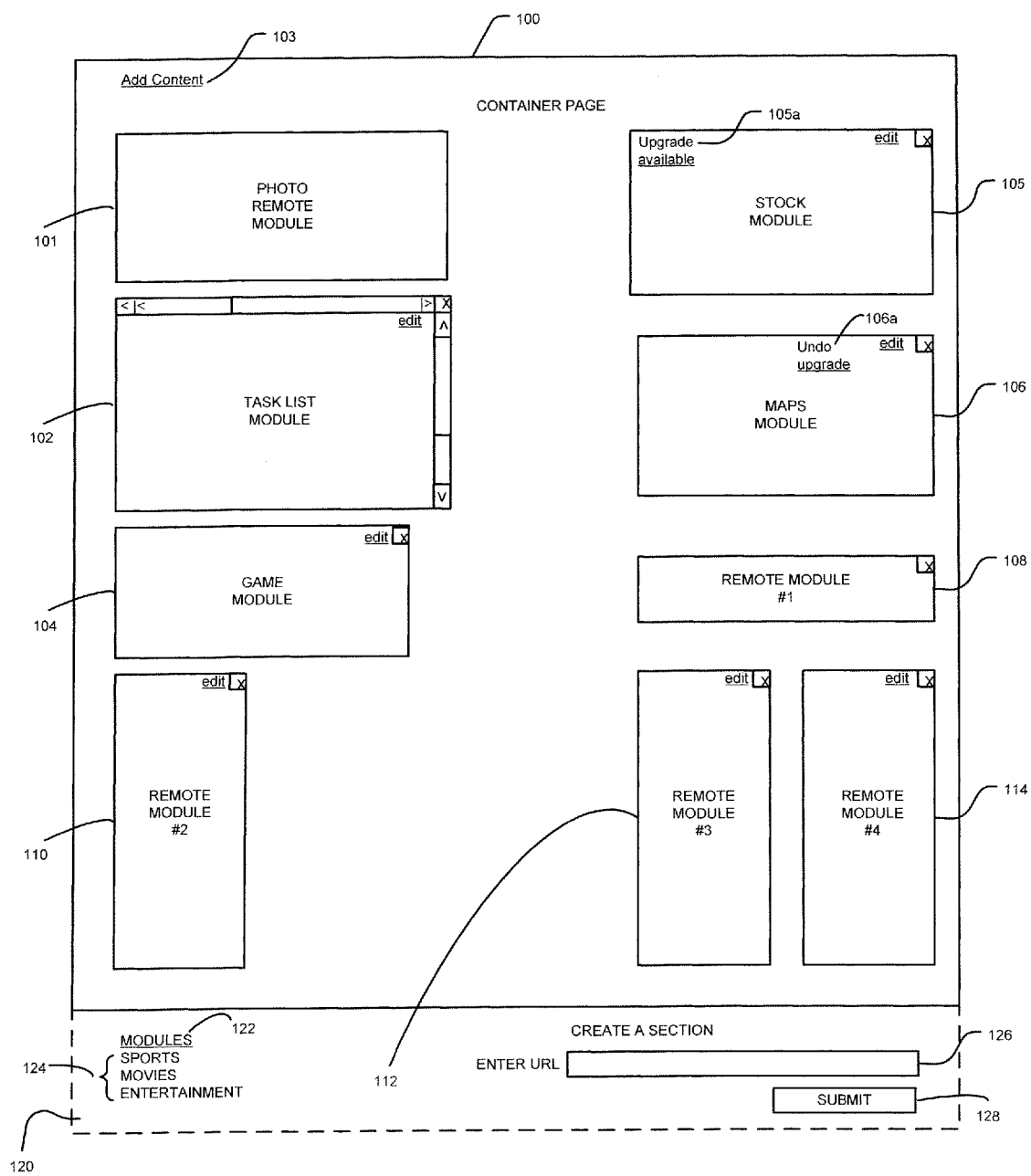
FIG. 2 depicts an illustrative container document according to an embodiment of the present invention.

It should be appreciated that various forms of the container document may exist but one such illustrative example is depicted in FIG. 2. FIG. 2 depicts a container page 100 with a plurality of modules that have been incorporated into the container document. A plurality of methods of incorporation is possible including the use of the IFRAME and inline HTML techniques. These issues will be discussed in greater detail below. FIG. 2 depicts a plurality of modules including a photo remote module 101, a task list module 102, a game module 104, a stock module 105, a maps module 106, a remote module 108, a remote module 210, a remote module 312, and a remote module 114. Different formats for the various modules may exist depending upon the specifications provided by the creator of the module. As depicted, some modules may provide scroll bars, and others may not. Some modules may be different sizes or shapes than other modules. In addition, some modules may offer the opportunity for the user to edit the display preferences and/or per-use data associated with the module. (See, for example, modules 102, 104, 105, 106 and 110 that provide an edit link.) For example, if the module relates to a maps module 106, the user may be provided the opportunity to edit an address or addresses that are mapped in that module. In one embodiment, inlined modules may be automatically sized by a container document so no scrolling, height or scaling information may be provided. If a module developer wants the module to have these properties in this embodiment, an inlined module may be wrapped with a fixed size <DIV> tag and content placed in the tag. The scroll bar, height and other characteristics may be then specified for the inlined content. One of the attributes allows specifying scaling=" . . . " to let the developer indicate how a module may be scaled up or down for different sizes of placements in the container documents.

One of the functions provided with this example container document 100 is the opportunity to add content to the container page through selecting the add content element 103. Upon selecting "add content" element 103, the system may offer the user the opportunity to interactively indicate an additional element to be included in the container page. Various forms of an interface to receive that input may be provided. One illustrative form is presented in FIG. 2 toward the bottom of the page in section 120. In that section, the user may be presented with an interface element to select from a browsable list of modules that may be arranged into a categorization structure. Another section of input section 120 may enable the user to specify a reference to a location for a module to be incorporated into the container document. Such a section may be such as that depicted through an input box 126 with a submit element 128. In one illustrative example, the user may specify a location reference (e.g., the uniform resource locator (URL)) where data exists related to a module to be incorporated. As explained in greater detail below, one example of the data is an XML-based file that meets the scripting preferences of the operator of the container document system 10.

At its base level, the specification may comprise a plurality of elements including the XML version information, module preferences, which may be optional, user preferences, which may be optional, a content type designator and then a content element that is used to populate the portion of the container allocated for the module. It should be appreciated that the content may be specified in various forms of code, typically code that is interpretable by a user system when generating the container for presentation. Such code may include HTML, JavaScript, or other forms of code that may be used to depict the format of a web page.

According to another embodiment of the present invention, the module specification may be embedded in one or more other files or computer instructions. According to this embodiment, the module server 14 may, when provided with the identification of data for generating a module, look for a module specification within the data.

Illustrative Process to Control Communication

According to exemplary embodiments, IFRAMEs may be used to control communication within a container document. As noted above, module content may be presented in an IFRAME hosted on a domain separate from the domain of the container server. In such an embodiment, policies may exist that prevent an IFRAME that may be hosted on the separate domain from communicating with and/or accessing the container server. One such policy, for example, may be referred to as the "Same Origin Policy."

In exemplary embodiments, communication between an IFRAME and the container document may be controlled. In exemplary embodiments, this communication may be controlled to limit access to the domain of the containing window.

Figure 3:
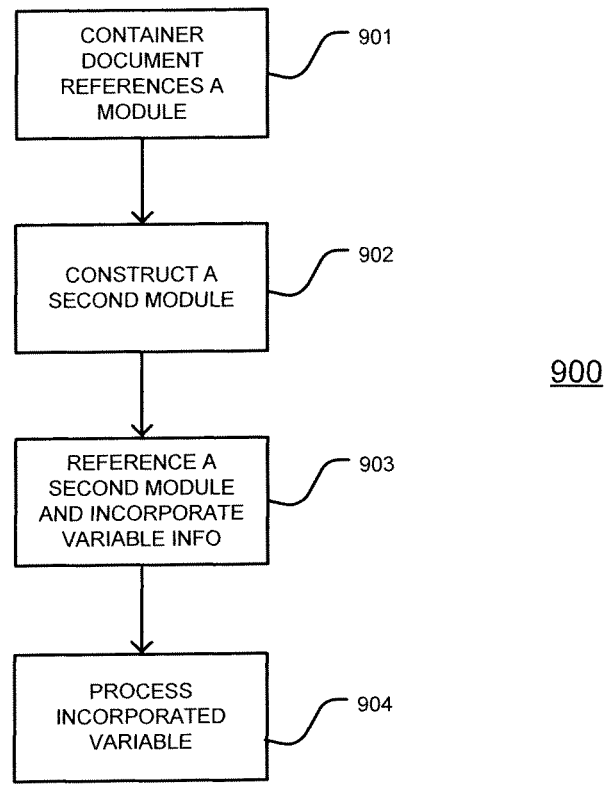
FIG. 3 depicts an illustrative process for controlling communication within a container document according to an embodiment of the present invention.
Figure 3B:
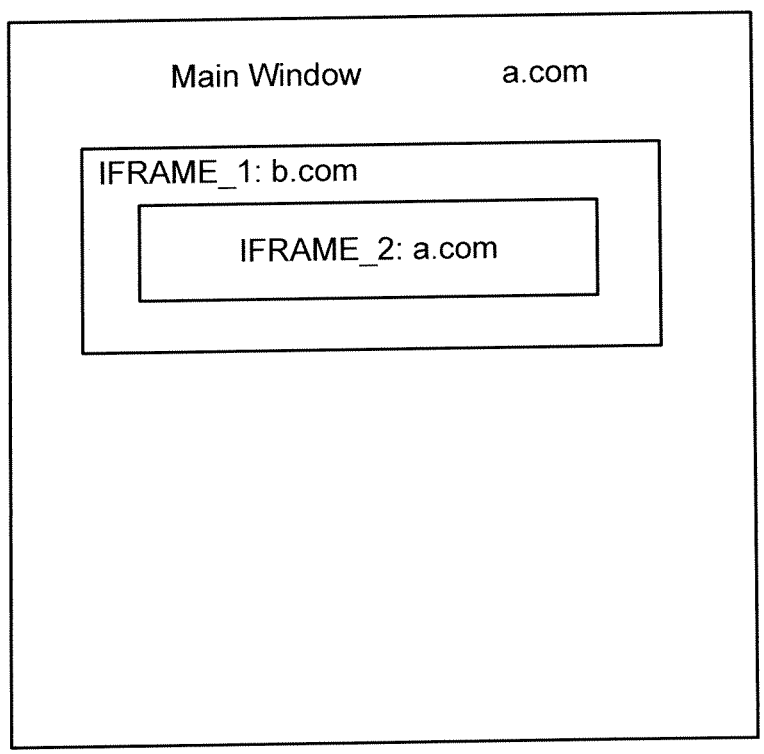
FIG. 3*b* depicts a diagram illustrating an arrangement of IFRAMES within a container document according to an embodiment of the present invention.

FIG. 3 depicts an exemplary flow chart 900, which illustrates an exemplary method for controlling communication within a container document. In one exemplary embodiment, communication between a container document hosted on one domain and a module hosted on a different domain may be controlled, for example. According to one example, control may be provided by providing a second IFRAME within a first IFRAME inside a container document as depicted in FIG. 3(*b*). As used herein, domain should be understood to be a source, such as a single DNS entry (e.g., www.google.com) or related DNS entries (e.g., all registrations with the base name www.google.com) or sometimes referred to as a trust domain.

In block 901, the container document may reference a module. In an exemplary embodiment, the container document may include code, for example, that references an IFRAME. As is shown in FIG. 4, in an exemplary embodiment, where the container document is hosted by one domain (e.g., a.com), the reference to an IFRAME hosted by a different domain (e.g., b.com) may be a URL (e.g., src="http://b.com/iframe_1.html"). There may be many reasons for hosting a container document on one domain (a.com) and a module (e.g., an untrusted plugin or the like) on a different domain (b.com). For example, a host of the container document may isolate the code of the module. By isolating the module code, the host of the container document may prevent the module from accessing the domain of the host of the container document (a.com), thus preventing the module from accessing cookies and availing itself of cross-site scripting (XSS) exploits. By preventing or restricting the module from accessing the domain of the host of the container document, the module is not likely to be able to communicate with the container document.

In an exemplary embodiment, as is shown in FIG. 4, the container document may also include code for receiving a parameter. For example, the container document may include a script defining a "ProcessPayload" function that receives "payload" as a parameter. In such an embodiment, the "ProcessPayload" function may be any function that receives the "payload" and processes the "payload," where the "payload" represents a structure of a string of characters that may represent any value. While the "ProcessPayload" function is included in the container document in the example shown in FIG. 4, it will be understood that the "ProcessPayload" function does not have to be defined within the container document, and may be defined and/or executed elsewhere. Further, in an exemplary embodiment, the logic encapsulated by such a function may be executed separate from the function.

In block 902, a second module may be constructed. In an exemplary embodiment, as is shown in FIG. 5, the module may include a script (e.g., var iframe_2=document.createElement("IFRAME")) to construct the second module. Further, as is shown in FIG. 5, the IFRAME may include module content for displaying the module within the container document, for example. In an exemplary embodiment, this exemplary script may be inserted into the code of the module by the host of the module (b.com) as part of the mechanism to control communication between the module and the container document. In still a further exemplary embodiment, the second module may be dynamically constructed.

In block 903, the module may reference the second module. In an exemplary embodiment, the module may include code, for example, that references a second IFRAME. As is shown in FIG. 5, in an exemplary embodiment, where the module is hosted by one domain (e.g., b.com), the reference to a second IFRAME hosted by a different domain (e.g., a.com) may be a URL (e.g., src="http://a.com/iframe_2.html").

Further, as is shown in FIG. 5, the reference to the second module may incorporate variable information into the reference to the second module. In an exemplary embodiment, the URL reference to the second module may include a hashing symbol "#" and append variable information ("payload") to the URL. While a hashing symbol is shown and described, any other mechanism to incorporate the variable information and/or parameters into the URL may be used, such as, for example, through a filename, directory path, or subdomain name in the URL.

As is shown and described, in an exemplary embodiment, the container document and the second module may be hosted by the same domain (a.com). By incorporating variable information into the reference to the second module, the container document may be able to receive the variable information and process the variable information because the container document and the second module may not be precluded from communicating with each other.

In block 904, the incorporated variable information may be processed. In an exemplary embodiment, the second module may include code, for example, that processes the variable information. As is shown in FIG. 6, in an exemplary embodiment, the second module may include a script that may remove the variable information from the URL ("[payload]=location.hash") and a function to process the variable information (window.parent.parent.ProcessPayload([payload]). As shown and described, by receiving and processing the variable information, the module hosted on one domain (b.com) may be able to communicate the variable information to the container document hosted on a different domain (a.com).

FIG. 7 depicts an illustrative example of a module 911 hosted on one domain (e.g., IFRAME_1 hosted on b.com) that may communicate with a container document 910 hosted on a different domain (MAIN_WINDOW hosted on a.com). In an exemplary embodiment, a browser may prevent a.com from communicating with b.com. In the example illustrated in FIG. 9E, module 911 may communicate variable information to container document 910 to resize module 911.

As shown in FIG. 8, container document 910 may include a function 913 to resize module 911. In an exemplary embodiment, this finction 913 may receive variable information (e.g., "height") from module 911 and set the module height (e.g., iframe_1.style.height=height+"px").

Module 911 may include a function 914 to determine the height of module 911. Module 911 may also include a script 915 to construct a second module 912. Further, module 911 may include a reference 916 to a second module 912. The reference 916 to second module 912 may incorporate variable information to be communicated to second module 912. In an exemplary embodiment, second module 912 may be hosted on the same domain as the container document (IFRAME_2 hosted on a.com).

Second module 912 may include a script 917 to extract the variable information from reference 916 to second module 912 and a script 918 to resize module 911.

FIG. 8 depicts an illustrative example of a module 921 hosted on one domain (e.g., IFRAME_1 hosted on b.com) that may communicate with a container document 920 hosted on a different domain (MAIN_WINDOW hosted on a.com). In an exemplary embodiment, a browser may prevent a.com from communicating with b.com. In the example illustrated in FIG. 8, module 921 may communicate variable information to container document 920 to save a preference for module 921.

As shown in FIG. 8, container document 920 may include a function 923 to save a preference of module 921. In an exemplary embodiment, this function 923 may receive variable information (e.g., "pref_value") from module 921 and communicate with a.com to save the variable information.

Module 921 may include a script 924 to construct a second module 922. Further, module 921 may include a reference 925 to a second module 912. The reference 925 to second module 922 may incorporate variable information (e.g., "value") to be communicated to second module 922. In the exemplary embodiment illustrated in FIG. 9F, the variable information may be passed as a URL parameter using a hashing function. Further, in an exemplary embodiment, second module 922 may be hosted on the same domain as the container document (IFRAME_2 hosted on a.com).

Second module 922 may include a script 926 to extract the variable information from reference 925 to second module 922 and a script 927 to save the preference of module 921.

Other Illustrative Example Environments

It should be readily apparent that the processes and systems described herein may be utilized in other contexts and environments within the scope of the invention. For example, the container document may comprise a page generated from a hosted page creator (e.g., geocities.com or pages.google.com, etc.). In this context, an IFRAME in a page being created or previously created may include a module (e.g., a plugin) that is maintained on a domain different from the hosted page creator domain and the module may then utilize an IFRAME to generate content that permits modification of the page being created for the hosted page creator may reference include an IFRAME that permits modification of the page being created or already created in a safe manner.

Further, the IFRAME that wraps the code also may be invisible to the user on the container document (e.g., webpage). As a result, using this technique, user interaction may be eliminated, in one exemplary iteration, to employ the IFRAME in an IFRAME technique described herein.

In another example, any web page (e.g., personal, corporate, educational, etc.) may use the IFRAME within an IFRAME method and system to include features or content from a third party while limiting the third party's ability to detect cookies on the server of the web page or create other security/privacy problems.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method, comprising:
   providing, at a computer system, a container document that is hosted by a first domain;
   containing by the computer system a first module within the container document in response to a user specifying a reference to a location for the first module, the first module being hosted by a second domain that is distinct from the first domain and distinct from the computer system;
   containing by the computer system a second module within the first module, wherein the first module references the second module within the first module, the second module being hosted by and associated with the first domain that hosts the container document, and the second module is distinct from the container document; and
   enabling communication between the first and second domains by the computer system;
   wherein the method includes automatically executing, by the computer system, commands in the first module and second module, which includes communicating information from one of the first and second domains to the other of the first and second domains.

2. The method according to claim 1, wherein the reference to the second module incorporates variable information to be communicated to the second module, wherein the method includes communicating the variable information from the first module to the second module.

3. The method according to claim 2, wherein the second module extracts the variable information and provides the variable information to the container document.

4. The method according to claim 1, wherein the reference to the second module comprises a uniform resource locator (URL).

5. The method according to claim 2, wherein the variable information comprises a portion of a URL string.

6. The method of claim 5 wherein the portion of the URL string comprises a URL parameter.

7. The method of claim 5 wherein the portion of the URL string comprises at least a portion of a filename.

8. The method of claim 5 wherein the portion of the URL string comprises at least a portion of a subdomain name.

9. The method of claim 5 wherein the portion of the URL string comprises at least a portion of a directory path.

10. The method according to claim 1, wherein each of the first and second modules is an independent instance within the container document.

11. The method according to claim 1, further comprising storing the container document on a first server associated with the first domain.

12. The method according to claim 11, further comprising storing the first module on a second server associated with the second domain.

13. The method according to claim 12, further comprising storing the second module on the first server.

14. The method according to claim 1, wherein the first module utilizes an inline frame.

15. The method according to claim 1, wherein the second module utilizes an inline frame.

16. The method according to claim 1, wherein the container document contains the first module through an IFRAME.

17. The method according to claim 1, wherein code associated with the first module is isolated from the first domain.

18. A system that serves content in a container document, the system comprising:
   a container server comprising a computer system that includes a processor and memory and that is associated with a first domain, the container server for identifying a first module hosted by a second domain for use with the container document hosted by the first domain in response to a user specifying a reference to a location for the first module, receiving a module specification associated with the first module from the second domain, and serving the container document with module data based on the module specification;
   wherein the module data references a second module within the first module, the second module being hosted by and associated with the first domain that hosts the container document, and the second module is distinct from the container document,
   wherein the second domain is distinct from the first domain, and communication is enabled between the first and second domains, and
   wherein commands in the first module and second module are automatically executed by the computer system for communicating information from one of the first and second domains to the other of the first and second domains.

19. A method, comprising:
   providing, at a computer system, a first module to be contained within a container document in response to a user specifying a reference to a location for the first module, the container document being hosted by a first domain and the first module being hosted by a second domain that is distinct from the first domain and distinct from the computer system; and
   enabling by the computer system communication between the first domain and the second domain by referencing a second module within the first module, the second module being hosted by and associated with the first domain that hosts the container document, wherein the second module is distinct from the container documents;
   wherein the method includes automatically executing, by the computer system, commands in the first module and second module, which includes communicating information from one of the first and second domains to the other of the first and second domains.

20. A computer system that provides content to be served in a container document hosted by a first domain, the computer system comprising:
   a module server that includes a processor and memory and that is associated with a second domain, the module server being configured to receive a request from the first domain for a first module and provide the first module to the first domain, wherein the module server receives the request in response to a user specifying a reference to a location for the first module;

wherein the first module is hosted by the second domain and includes a reference to a second module within the first module, the second module being hosted by and associated with the first domain that hosts the container document, and the second module is distinct from the container document, wherein the second domain is distinct from the first domain, and communication is enabled between the first and second domains, and wherein the first module and second module include commands that are automatically executed by the computer system for communicating information from one of the first and second domains to the other of the first and second domains.

21. A method, comprising:

providing, at a computer system, a container document, the container document being hosted by a first domain;

containing by the computer system a first inline frame within the container document in response to a user specifying a reference to a location for the first inline frame, the first inline frame being hosted by a second domain that is distinct from the first domain;

containing by the computer system a second inline frame within the first inline frame; and enabling communication between the first and second domains;

the method including automatically executing, by the computer system, commands in the first inline frame and second inline frame, which includes communicating information from one of the first and second domains to the other of the first and second domains, wherein, the first inline frame includes data to generate a uniform resource locator (URL) string that includes a parameter that references the second inline frame within the first inline frame, the second inline frame being hosted by and associated with the first domain that hosts the container document, and the second inline frame is distinct from the container document, and wherein the second inline frame includes data to extract the parameter and pass the URL parameters to the container document.

22. A computer system, including a processor and memory that serves content in a container document hosted by a first domain, the computer system comprising:

a container server associated with the first domain, the container server being configured to identify a first inline frame hosted by a second domain for use with the container document hosted by the first domain in response to a user specifying a reference to a location for the first inline frame, receive a module specification associated with the first inline frame from the second domain, and serve the container document with module data based on the module specification, wherein the second domain is distinct from the first domain; and a module server associated with the second domain, the module server being configured to receive a request from the container server for the first inline frame and provide the first inline frame to the container server;

wherein the first inline frame includes data to generate a uniform resource locator (URL) string that includes a parameter that references a second inline frame within the first inline frame, the second inline frame being hosted by the first domain that hosts the container document and associated with the container server, and the second inline frame is distinct from the container document, wherein the second inline frame includes data to extract the parameter and pass the parameter to the container document, wherein communication is enabled between the first and second domains, and wherein the first inline frame and second inline frame include commands that are automatically executed for communicating information from one of the first and second domains to the other of the first and second domains.

* * * * *